(12) United States Patent
Caviglia et al.

(10) Patent No.: US 7,746,814 B2
(45) Date of Patent: Jun. 29, 2010

(54) METHOD FOR DISTRIBUTED MULTICAST ROUTING IN CONNECTION-ORIENTED NETWORKS AND NETWORK FOR APPLYING THIS METHOD

(75) Inventors: Diego Caviglia, Savona (IT); Giovanni Fiaschi, Genoa (IT); Francesco Lazzeri, Riva Trigoso (IT)

(73) Assignee: Ericsson AB, Stockholm (SE)

( * ) Notice: Subject to any disclaimer, the term of this patent is extended or adjusted under 35 U.S.C. 154(b) by 753 days.

(21) Appl. No.: 10/476,165

(22) PCT Filed: May 3, 2002

(86) PCT No.: PCT/IB02/02521

§ 371 (c)(1),
(2), (4) Date: May 28, 2004

(87) PCT Pub. No.: WO02/091670

PCT Pub. Date: Nov. 14, 2002

(65) Prior Publication Data

US 2006/0104274 A1 May 18, 2006

(30) Foreign Application Priority Data

May 4, 2001 (IT) .......................... MI2001A0916

(51) Int. Cl.
*H04H 20/71* (2008.01)
*G01R 31/08* (2006.01)
*H04L 12/28* (2006.01)
*H04W 40/00* (2009.01)

(52) U.S. Cl. ...................... 370/312; 370/238; 370/351; 455/445; 709/238

(58) Field of Classification Search .................. 370/312, 370/238, 252, 338, 432, 408, 328, 351; 709/238, 709/241, 244; 455/445, 41.2, 41.3, 422.1, 455/446, 507, 517
See application file for complete search history.

(56) References Cited

U.S. PATENT DOCUMENTS 5,946,316 A * 8/1999 Chen et al. ................... 370/408
6,088,333 A * 7/2000 Yang et al. ................... 370/238
6,785,277 B1 * 8/2004 Sundling et al. ............ 370/392

FOREIGN PATENT DOCUMENTS

EP 0 854 618 A2 7/1998
JP 11-225159 8/1999

OTHER PUBLICATIONS

*Multicast Routing Algorithm Using Predetermined Path Search for Layered Streams*, Takumi Miyoshi, et al., The Institute of Electronics, Information and Communication Engineers, IEICE Technical Report, Jun. 2000.
Tajima, et al., *Reliable Multicast Using Adaptive Coaching*, Transactions of the Institue of Electronis, Information and Communication Engineers B, vol. J84-B, No. 3, pp. 354-364, Mar. 1, 2001.

* cited by examiner

*Primary Examiner* — George Eng
*Assistant Examiner* — Wesley L Kim
(74) *Attorney, Agent, or Firm* — Kirschstein, et al.

(57) ABSTRACT

A method for multicast routing for a telecommunications network comprising a plurality of communication nodes interconnected by multiple paths, for the establishment of a multicasting connection between a source node and a plurality of destination nodes, in which the destination nodes are informed that a multicast connection request is arriving from a particular source. Each destination node then sends a connection request to the source, and these requests are processed and relayed by each node within the network. The requests are propagated from node to node until they reach the source node, carrying the information on the cost accumulated along the path. Finally, the source node, having received the information on the costs of the possible paths, selects the path which has a satisfactory cost.

11 Claims, 1 Drawing Sheet

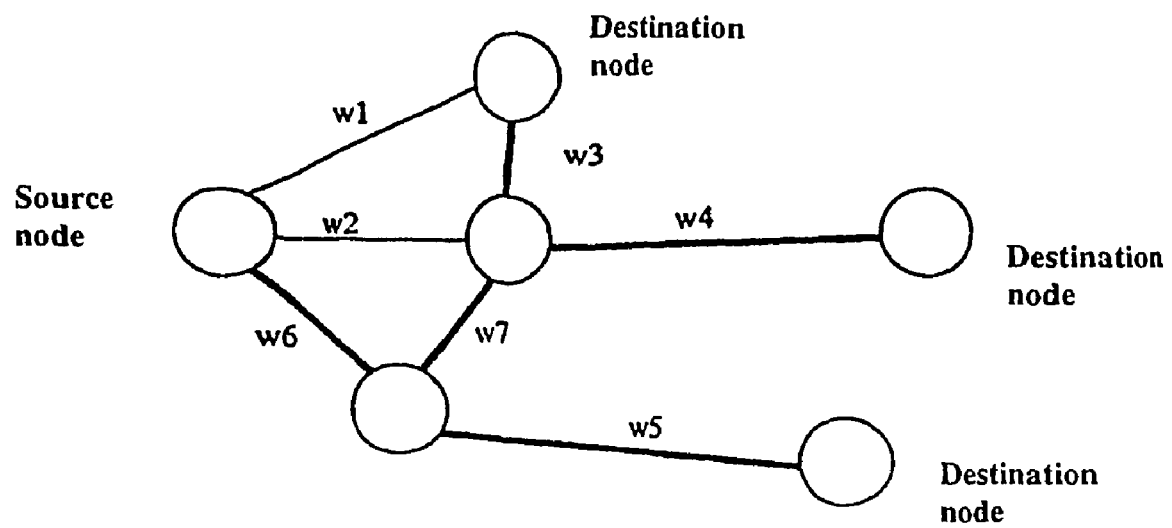

METHOD FOR DISTRIBUTED MULTICAST ROUTING IN CONNECTION-ORIENTED NETWORKS AND NETWORK FOR APPLYING THIS METHOD

The present invention relates to a multicast routing method of the distributed type for connection-oriented networks and to a network for applying this method.

Multicasting will be a very important service in the near future. However, no satisfactory multicast routing system suitable for connection-oriented networks (such as SDH networks) has been proposed as yet.

Multicasting in IP networks (DVMRP, MOSPF, PIM) is based on the existence of routing tables calculated previously by means of unicast protocols. In the case of connection-oriented networks, however, unicast protocols do not use routing tables, and therefore these known methods are not applicable in these networks. Moreover, results adapted from unicast tables do not in any case produce optimal solutions for the multicast situation.

Furthermore, the networks have not had a distributed control plane in the past, and all operations have been carried out by a centralised network control system. However, the requirement for distributed routing capacity within the network has arisen with the advent of new architectures (ASON, ASTN, GMPLS).

Because of the large number of networks which have already been installed, a solution having the smallest possible impact on the devices in use would clearly be preferable. Such a solution would naturally be considered by the greater part of the market as an optimal solution.

The general object of the present invention is to overcome the drawbacks mentioned above by providing a network and a method for distributed multicast routing which is particularly suitable for connection-oriented networks and which has a limited impact on the network devices.

With this aim in mind, a method has been devised, according to the invention, for multicast routing for a telecommunications network comprising a plurality of communication nodes interconnected by multiple paths, for the establishment of a multicasting connection between a source node and a plurality of destination nodes, comprising the steps of making the source node generate a destination notification message which is propagated in the network until it reaches the destination nodes, to inform them of the need to connect to the source node; making each destination node generate, on receipt of the destination notification message, a connection request containing information on the weighted connection costs; propagating the connection request in the network towards the source node, while collecting further information on the weighted connection costs accumulated along the path; receiving at the source node the connection requests propagated in the network from the destination nodes; selecting the multicasting paths with satisfactory costs according to the information received from the source node with the connection requests; and making the multicasting connection via the multicasting paths selected in this way.

Also according to the invention, a telecommunications network has been devised, comprising a plurality of communication nodes interconnected by multiple paths for the establishment of a multicasting connection between a source node and a plurality of destination nodes, in which the aforesaid method is applied for the multicast routing.

To clarify the explanation of the innovative principles of the present invention and its advantages over the known technology, a description is given below, with the aid of the single attached drawing, of a possible example of embodiment in which these principles are applied.

With reference to the figure, this shows a diagram of a generic network in which a certain number of nodes are connected to each other by communication paths. In the network, one source node wishes to establish a multicast call to a plurality of destination nodes, by making a suitable selection from the possible paths.

In the diagram, the source node is connected by a path (called the multicast tree) to one or more destination nodes (the leaves of the tree). A weight w is associated with each line connecting two nodes. Optimising a multicast tree means finding the paths which connect the source to all the drawing the selected path (drawn in heavier lines) between the source node and the destination nodes has a total weight or "multicast tree cost" of w6+w7+w5+w4+w3.

In the remainder of this document, the following terminology will be used, applied to a specified node:

D is the set of all the destination nodes;
$D_i$ is a generic subset of D;
$D_r$ is a subset of D consisting of the destination nodes which can be currently reached by a specified node;
$D_m$ is a subset of destination nodes which are currently linked to the specified node;
$AC_r$ (Accumulated Cost) is the cost accumulated along the path from the nodes of the set $D_r$ to the specified node;
PH (Previous Hop) is the address of the node sending the message requesting the creation of the connection.

A description will now be given of an automatic procedure used to find an optimal multicast tree to implement a given request for creation of a multicast connection. A high-level description of the protocol associated with this process will also be given.

According to the described solution, a distributed algorithm is provided, to avoid wasting resources. All the network elements (NE) of the network carry out the calculation operations in parallel. The information required to calculate the multicast routings travels within the network, making it unnecessary for the NE to maintain full visibility of the whole network.

According to the proposed solution, the establishment of multicast connections is based on an exchange of information in three steps.

In the first step, the destination nodes are informed that a multicast connection request is arriving from a particular source.

The second step is carried out both by the destination node and by the network: each destination node sends a connection request to the source, and these requests are processed and relayed by each node within the network. The requests are propagated from node to node until they reach the source node, carrying the information on the cost accumulated along the path.

The third step is confirmation of the establishment of the connection, in which the source node, having received the information on the costs of the possible paths, selects the path with a satisfactory cost.

The proposed solution enables requests arriving from different nodes to be combined, and enables messages requesting the creation of the multicast connection to be propagated between the nodes.

A description will now be given of the behaviour of the nodes and the information used to enable the source node to find the optimal path.

As stated above, the source node must first inform all the destination nodes that a multicast connection is to be established. To do this, the source node sends appropriate information to the destination nodes through the network. This procedure can be called the "destination notification procedure". The transmitted information can be in various forms, the important requirement being that, at the end of the destination notification procedure, each destination node has been informed that it is a destination node for this particular multicast connection and knows the address of the source.

When this has been achieved, each destination node sends back to the multicast source node a message requesting establishment of the connection. This message is called the "connection request" message. The connection request sent by a destination node to the source node contains the following information:

destination of the message (for practical purposes, this is the multicast source);

AC (Accumulated Cost): this represents the sum of the costs of the connections along which the message passes from $D_r$ to the node;

PH (Previous Hop): this is the address of the device (node) sending the message;

$D_r$: the set of the destination nodes which can be reached via the device (node) PH.

If a node receives two messages with the same $D_r$ and PH, the message with the higher AC is rejected.

A node receives the information propagated from the destination nodes, extracts useful information from it and stores it in a first table, which we shall call the "receive table", and which contains the information received from the PH.

From this table, the node calculates a second table, which we shall call the "send table". As explained below, this second table contains calculated information which the node sends to its neighbours.

For the purposes of implementation, these two tables can also be combined into a single table, as will be clear to a skilled person. However, for convenience of description, they will be described as separate tables in the following text, although it is to be understood that each of the described tables can form part of a single table.

The receive table has n inputs and the generic i-th input has the following fields:

$D_r$=set of destination nodes which can be reached via the corresponding PH;

$AC_r$=accumulated cost of the path from this node to all the nodes in $D_r$;

PH=address of the Previous Hop;

$E_n$=unique identifier of the input in the table.

On the other hand, the send table is obtained from the receive table by closure with respect to the combination of the discrete sets $D_r$. More specifically, it contains all the inputs of the receive table without the PH column, and has the following properties:

for each set R of indices such that $\cap_R D_r = \emptyset$, there is an index m such that $D_m = \cup_R D_r$ where R is a set of indices for indexed sets $D_r$, and $\cap$ is the intersection over the set of indices R for $D_r$; and $\cup$ is the union over the set of indices R for $D_r$.

for each set R of indices and for each index m such that $\cap_R D_r = \emptyset$ and $D_m = \cup_R D_r$, it is true that $AC_m \leq \tau_R AC_r$.

The send table also has an additional field (DF) indicating the set of records in the receive table from which it has been derived.

The tables are updated by the following procedure.

When a node receives a multicast connection creation request message, it takes the set of nodes $D_r$ which can be reached by the PH (Previous Hop) from the address field. It then looks in the send table to find an input i in the table with $D_i = D_r$.

If the input exists and $AC_i < AC_r$, the message is automatically rejected; otherwise, the i-th input in the receive table is replaced and/or supplemented with the information in the message. The send table is updated as a result: this means that the node tests all the possible combinations with an empty intersection between the new record and all the records in the table. If one or more of the combinations matches the properties of the send table, they are added or substituted in it; otherwise they are rejected.

The multicast connection creation requests are propagated by the following procedure.

Whenever a record in the send table is updated and/or created, a creation request message is sent to all the neighbouring nodes, with the exclusion if necessary (for optimisation) of the PH of the inputs of the receive table indicated by the DF field.

Finally, when the messages arrive at the source node, this node selects the path between it and the destination nodes by selecting, among the records in its receive table, the one having all the desired destination nodes in the $D_r$ field and having the lowest total cost AC.

It is now clear how the specified object has been achieved by the provision of a distributed multicast routing system having the desired minimal impact on the network and having high efficiency.

Naturally, the above description of an embodiment applying the innovative principles of the present invention has been provided solely in order to give an example of these innovative principles, and must not, therefore, be interpreted as limiting the scope of the patent claimed herein.

The invention claimed is:

1. A method of multicast routing for a telecommunications network comprising a plurality of communication nodes interconnected by multiple paths, for establishing a multicasting connection between a source node and a plurality of destination nodes, comprising the steps of:
   a) making the source node generate a destination notification message which is propagated in the network until the destination notification message reaches the destination nodes, to inform the destination nodes of a need to connect to the source node;
   b) making each destination node generate, on receipt of the destination notification message, a connection request message requesting establishment of the connection and containing information on weighted connection costs;
   c) propagating the connection request message in the network towards the source node, while collecting further information on the weighted connection costs accumulated along a path; and
   d) receiving at the source node the connection request messages propagated in the network from the destination nodes, selecting multicasting paths with satisfactory costs according to the information received from the source node with the connection request messages, and making the multicasting connection along the multicasting paths selected in this way, so that the multicasting connection is established for multicasting data from the source node to the destination nodes.

2. The method according to claim 1, in which the connection request message which is sent by the destination nodes and which is propagated in the network towards the source node contains at least the following information:
   i) Previous Hop (PH): address of a device node sending the message;
   ii) $D_r$: set of the destination nodes which can be reached via the PH; and iii) Accumulated Cost (AC): sum of the costs of the connections along which the message passes from $D_r$ to the device node.

3. The method according to claim 2, in which a node which receives information propagated from the destination nodes extracts useful information and stores the useful information in a receive table, and in which the node calculates, from the receive table, a send table, from which new information is extracted and propagated in the network towards the source node.

4. The method according to claim 3, in which the receive table has a generic i-th input having the following fields:
   i) the $D_r$;
   ii) $AC_r$=accumulated cost of the path from this node to all the nodes in the $D_r$;
   iii) the PH; and
   iv) $E_n$=unique identifier of the input in the table.

5. The method according to claim 4, in which the send table is obtained from the receive table by closure with respect to a combination of the discrete sets $D_r$, and has the following properties:
   i) for each set R of indices such that $\cap_R D_r = \emptyset$, there is an index m such that $D_m = \cup_R D_r$;
   ii) for each set R of indices and for each index m such that $\cap_R D_r = \emptyset$ and $D_m = \cup_R D_r$, it is true that $AC_m \leq \Sigma_R AC_r$.

6. The method according to claim 5, in which, when a node receives a multicast connection creation request message, it takes the set of nodes $D_r$ which can be reached by the PH from the address field, and then looks in its send table to find an input i in the table with $D_i = D_r$; if the input exists and $AC_i < AC_r$, the message is automatically rejected; otherwise, the i-th input in the receive table is replaced and/or supplemented with the information in the message.

7. The method according to claim 6, in which the node, in order to update its send table, tests all the possible combinations with an empty intersection between the new record and all the records in the table; if one or more of the combinations matches the properties of the send table, they are added or substituted in it; otherwise, they are rejected.

8. The method according to claim 5, in which the send table has an additional field (DF) indicating a set of records in the receive table from which it has been derived.

9. The method according to claim 8, in which, for the propagation of the multicast connection creation requests, whenever a record of the send table is updated and/or created in one node, a creation request message is sent to all the neighboring nodes, with the exclusion, if necessary, of the PH of the inputs of the receive table indicated by the DF field.

10. The method according to claim 3, in which, when the messages arrive at the source node, the source node selects the path between the source node and the destination nodes by selecting, among the records in its receive table, the one having all the desired destination nodes in the $D_r$ field and having the lowest total cost AC.

11. A telecommunications network, comprising: a plurality of communication nodes interconnected by multiple paths, for the establishment of a multicasting connection between a source node and a plurality of destination nodes, in which a method according to claim 1 is performed for the multicast routing.

* * * * *

UNITED STATES PATENT AND TRADEMARK OFFICE
CERTIFICATE OF CORRECTION

PATENT NO. : 7,746,814 B2  
APPLICATION NO. : 10/476165  
DATED : June 29, 2010  
INVENTOR(S) : Caviglia et al.

Page 1 of 1

It is certified that error appears in the above-identified patent and that said Letters Patent is hereby corrected as shown below:

On the Cover Page, item (56), under "OTHER PUBLICATIONS", in Column 2, Line 6, delete "Instittue of Electronis," and insert -- Institute of Electronics, --, therefor.

In Column 3, Line 58, delete "$AC_m \leqq \tau_R AC_r$." and insert -- $AC_m \leq \sum_R AC_r$ .--, therefor.

In Column 5, Line 24, in Claim 5, after "$D_r$,", insert -- and --.

Signed and Sealed this  
Twenty-second Day of February, 2011

David J. Kappos  
*Director of the United States Patent and Trademark Office*